United States Patent [19]

Morchand

[11] 3,730,986

[45] May 1, 1973

[54] TELEVISION TRANSMISSION SYSTEM FOR TWO CLASSES OF INFORMATION

[75] Inventor: Charles A. Morchand, New York, N.Y.

[73] Assignee: Data-Plex Systems, Inc., New York, N.Y.

[22] Filed: Apr. 5, 1971

[21] Appl. No.: 131,231

Related U.S. Application Data

[63] Continuation-in-part of Ser. No. 862,593, Aug. 26, 1969.

[52] U.S. Cl. ............................178/5.6, 178/DIG. 23

[51] Int. Cl. ..............................................H04n 7/08

[58] Field of Search........................178/5.6, 5.8, 6.8, 178/DIG. 23

[56] References Cited

UNITED STATES PATENTS 3,488,435 1/1970 Eilenberger..........................178/5.6

3,562,421 2/1971 Moskovitz et al. ............178/DIG. 23

FOREIGN PATENTS OR APPLICATIONS 591,956 2/1960 Canada.........................178/DIG. 23

OTHER PUBLICATIONS

NASA Tech Brief, "Multiplex Television Transmission System," Dec. 1967, Brief 67–10576.

*Primary Examiner*—Richard Murray
*Attorney*—Hane, Baxley & Spiecens

[57] ABSTRACT

A television transmission system normally transmits fields of general viewer information which is interspersed with cuts. After at least some of the cuts a field of special viewer information is transmitted instead of the field of general viewer information. Associated with the field of special viewer information is a characteristic signal to identify the field so that a special television receiver, upon sensing the signal, can extract the field of special viewer information for display.

9 Claims, 6 Drawing Figures

TELEVISION SYSTEM TS

TELEVISION RELAY STATION TRS

INVENTOR.
CHARLES A. MORCHAND
BY Hane, Baxley and Spiecens
ATTORNEYS

INVENTOR.

BY

ATTORNEY

INVENTOR.

BY

ATTORNEY

TELEVISION TRANSMISSION SYSTEM FOR TWO CLASSES OF INFORMATION

This invention pertains to television transmission which can simultaneously transmit two classes of information and is a continuation-in-part of my copending application, Ser. No. 862,593, filed Aug. 26, 1969.

The most common class of viewer information is general viewer information such as commercial television programming which is broadcast over a wide area such as a city. In order to get long haul transmission of such information the television networks generally lease microwave or coaxial links from common carriers such as the American Telephone and Telegraph Co. Such long haul transmission is extremely expensive and at present can only be justified for mass audiences or for national defense.

There is another class of viewers or users who require a display terminal for intermittent information. At present these users rely on teletypewriters, teleprinters and facsimile devices. In addition to these users, there are others in this class who are awaiting faster, more versatile and economic display systems. In any event, this second class of users are in the following fields: communication services requiring visual displays; information services handling slide shows, stock market reports, news reports, etc.; bibliographic services requiring information retrieval from central libraries; computer graphics services; computer aided education; and multiaccess computing.

This second class of users generally cannot afford the cost of long haul and specialized transmission.

There have been proposed systems wherein a field or frame of special viewer information is periodically substituted for a field or frame of general viewer information during the transmission of general viewer information programs. This inserted field is prefixed by a characteristic signal which alerts special receivers to extract only the special viewer fields or frames. However, the special viewer fields or frames may be noticed by the general viewers having conventional television receivers. Minimally, a general viewer may see an imperfect image or a flick of light when the special viewer field or frame is received.

It is an object of the invention to minimize the effect of such special viewer information during the reception of general viewer programs by the public.

It has been found during normal television programming that, typically, very few scenes last for more than half a minute. Normally, during such programming, the program director switches among several cameras, etc. At each change of scene, there is an interval of time called a cut. It has also been found that during and immediately after the cut, a viewer is momentarily insensitive to any light flick in the picture. Whether this phenomenon is psychological or physiological is not known. However, it does occur and the present invention exploits this phenomenon.

In particular, the invention contemplates a television transmission system comprising a first source of at least fields of general viewer information which is interspersed with cuts and a second source of at least fields or portions thereof of special viewer information. A transmitter means transmits fields of viewer information. Interposed between the sources and the transmitter means is a switching means which normally connects the first source to the transmitter means so that fields of general viewer information are normally transmitted. There is a sensing means which senses the cuts to activate a control means which causes the switching means to connect the second source to the transmitter means for a given period of time.

Other objects, the features and advantages of the invention will be apparent from the following detailed description when read with the accompanying drawing which shows by way of example apparatus for practicing the invention.

Figure 1:
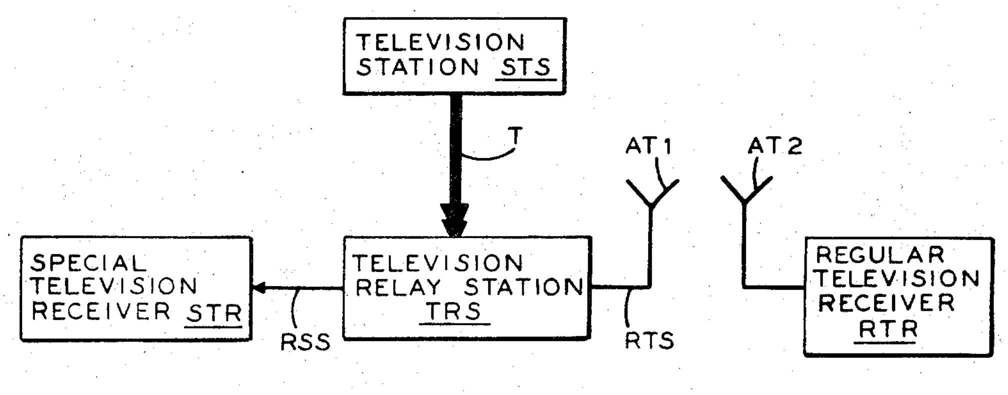
FIG. 1 shows a block diagram of a television transmission system incorporating the invention.

In FIG. 1 there is shown a television system comprising a source television station STS coupled via a coaxial cable or microwave link TO to a television relay station TRS which is turn feeds television signals, via cable RSS, to a special television receiver STR and, via antenna AT1, to regular television receiver RTR.

In general television station STS transmits general viewer information which is the general programming available to the public. However, interspersed in the fields of this information are fields of special viewer information. Each field of special viewer information follows a cut in the general viewer information. Each such field of special viewer information is prefixed by a characteristic signal such as a high frequency audio tone although other signals such as pulse coding could be used. The television relay station TRS for the present example will transmit all information, unmodified, via cable RSS, to special television receiver STR. It should be noted that although there is only one special television receiver STR shown for the sake of simplicity, any such system would have a plurality of such receivers. The special television receiver STR selects only the fields of special viewer information and ignores the remaining fields. In addition, television relay station TRS strips out the fields of special viewer information and transmits over-the-air the remaining fields of information to conventional home receivers such as regular television receiver RTR.

There are several variations to the system which are worth considering. Television station STS could be a regular television station which transmits over-the-air to all television receivers, both regular and special. In which case the regular receivers RTR would receive the special fields along with the general viewer fields. However, these special fields occur only randomly and after a cut so that they should be, for all practical purposes, invisible to a viewer. Furthermore, if a television relay station TRS is used it is possible for this relay station to be provided with means for selecting only the special viewer fields for transmission via cable RSS to special viewer receivers which could then be regular home type receivers. Furthermore, it should be realized that the special television receiver STR need not be a conventional display device but could include a frame store video tape recorder or hard copy device which captures and remembers the special fields for later and/or continuous display. In any of these variations the common theme is that the special fields follow cuts in the general programing and each such field is prefixed by a characteristic signal identifying it as a special field.

Figure 2:
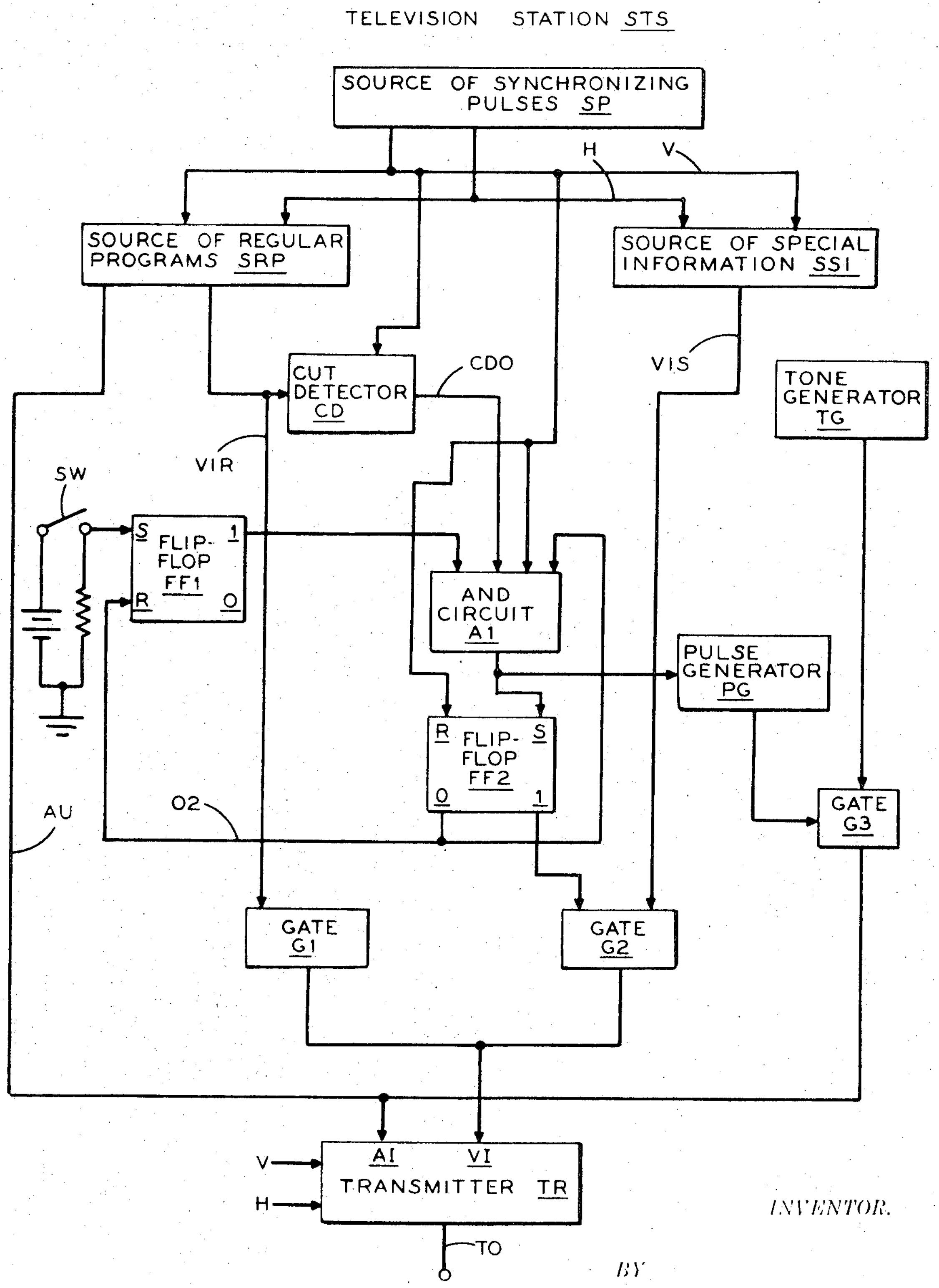
FIG. 2 is a block diagram of the television station of the system of FIG. 1.

In FIG. 2 the television station STS centers around the source of regular programs SRP and the source of special information SSI. Although source SSI can take many forms, in its simplest form it can be a television camera focused on changeable display cards. Source SRP can be the output of a live television studio or a video tape recorder. The television cameras of both sources receive their vertical and horizontal sync pulses via lines V and H, respectively, from source of synchronizing pulses SP. The video output of source SRP is connected via line VIR to the signal input of gate G1; and the video output of source SSI is connected via line VIS to the signal input of gate G2. The outputs of gates G1 and G2 are connected to the video input VI of transmitter TR. The control inputs of gates G1 and G2 are connected to complementary outputs of flip-flop FF2. Gates G1 and G2 as well as all other gates disclosed herein can be field-effect transistor gates.

The state of the flip-flop FF2 determines which source feeds video signals to transmitter TR. When flip-flop FF2 is in the cleared state, its 0 output is high and gate G1 is open, and its 1 output is low and gate G2 is closed. Flip-flop FF2 is generally in the cleared state, since its clear input R is connected to the constantly recurring once-per-field-time vertical sync pulses from line V. (However, it should be noted that flip-flop FF2 and all other disclosed flip-flops are of the set-dominant type, i.e., if they receive pulses simultaneously at their clear terminals R and their set terminals S, they will be forced to the set state.)

Normally, the fields of general viewer information (conventional programing) are transmitted by transmitter TR along with their audio, fed via line AU to the audio input AI thereof.

When a field of special viewer information is to be transmitted switch SW is momentarily closed, setting flip-flop FF1 whose set input S is connected to the output of switch SW. The 1 output of flip-flop FF1 is connected to an input of and-circuit A1 which can be a four-input coincidence circuit. The next occurring cut in the general programing is detected by cut detector CD whose input is connected to line VIR. Cut detector CD, hereinafter more fully described, transmits a signal on line CDO to the second input of and-circuit A1. The first vertical sync pulse thereafter causes and-circuit A1 to transmit a pulse to the set input S of flip-flop FF2 and to the input of pulse generator PG. It should be noted that the fourth input of and-circuit A1 is connected to the 0 output of flip-flop FF2 which is at this time "up". Flip-flop FF2 switches to the set state causing gate G2 to open and gate G1 to close. Therefore, the video signals from source SSI, the special viewer information, enter the video input VI of transmitter TR. At the same time pulse generator PG, which can be a "one-shot" multivibrator emits a pulse of given time duration which opens gate G3. A burst of audio tone, preferable outside the passband of the speakers in conventional television receives passes from tone generator TG, an audio oscillator, via gate G3 to the audio input AI of transmitter TR. It should be noted that this burst is at the beginning of the special field and can last for the time of about one scan line. The next occurring vertical sync pulse received by the clear input R, clears flip-flop FF2, closing gate G2 and opening gate G1, and normally programing fields are again transmitted. The clearing of flip-flop FF2 causes a step waveform to be transmitted via line 02 to the clear input R of flip-flop FF1 and the station is ready to transmit another special field under control of switch SW. Although switch SW has been shown as a manual switch, it is preferably an electronic pulser which periodically operates.

Transmitter TR comprises the modulators and other waveform generators which are at the output of a station and is synchronized by the source of synchronizing pulses SP as indicated by the V and H signal inputs.

Figure 3:
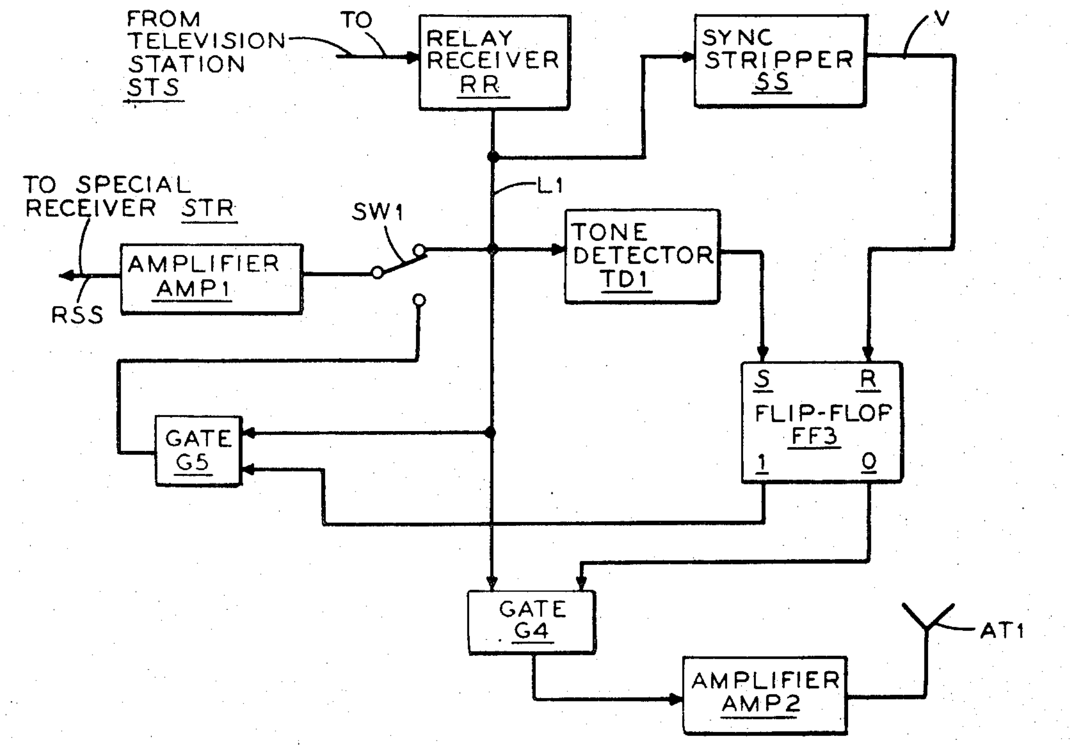
FIG. 3 is a block diagram of the television relay station of the system of FIG. 1.

The television relay station TRS is shown in FIG. 3 comprising a conventional relay receiver which receives signals from line TO, amplifies the signals and retransmits the amplified signals on line L1. The signals on line L1 pass via switch SW1 when in the shown position through amplifier AMP1 which can include frequency converters if desired to line RSS. Thus the signals on line TO from the television station STS pass unmodified to the special receiver STR. In addition, the signals on line L1 are fed to conventional sync stripper SS when the vertical sync pulses are extracted and fed via line V to the clear input of flip-flop FF3. The 0 output of flip-flop FF3 is connected to the control input of gate G4 whose signal input is connected to line L1. Normally, flip-flop FF3 is in the clearest state and the signals on line L1 pass via amplifier AMP2 which can include frequency converters if desired to antenna AT1 for broadcast to the antenna AT2 of regular television receiver RTR. (See FIG. 1). Whenever the characteristic signal is received by receiver RR, tone detector TD1, hereinafter more fully described, transmits a pulse to the set input S of flip-flop FF3 which switches to the set state closing gate G4. The next occurring vertical sync pulse again clears flip-flop FF3 opening gate G4. Since the characteristic signal is at the start of the special field and the next occurring vertical sync pulse is effectively at the end of this field gate G4 is closed during the reception of the special field and the video signals for this field do not reach antenna AT1.

If it is desired that relay station TRS only transmit special fields to special receiver STR then switch SW1 is moved to the opposite position, connecting the input of amplifier AMP1 to the output of gate G5' . The signal input of gate G5' is connected to the line L1 and the control input is connected to the 1 output of flip-flop FF3. Thus, when flip-flop FF3 is set, gate G5' is open and when it is reset gate G5' is closed. Therefore, only the special fields are transmitted to amplifier AMP1. For such a case the special receiver can be a conventional receiver, preferably with a long persistent phosphor cathode-ray tube.

Figure 4:
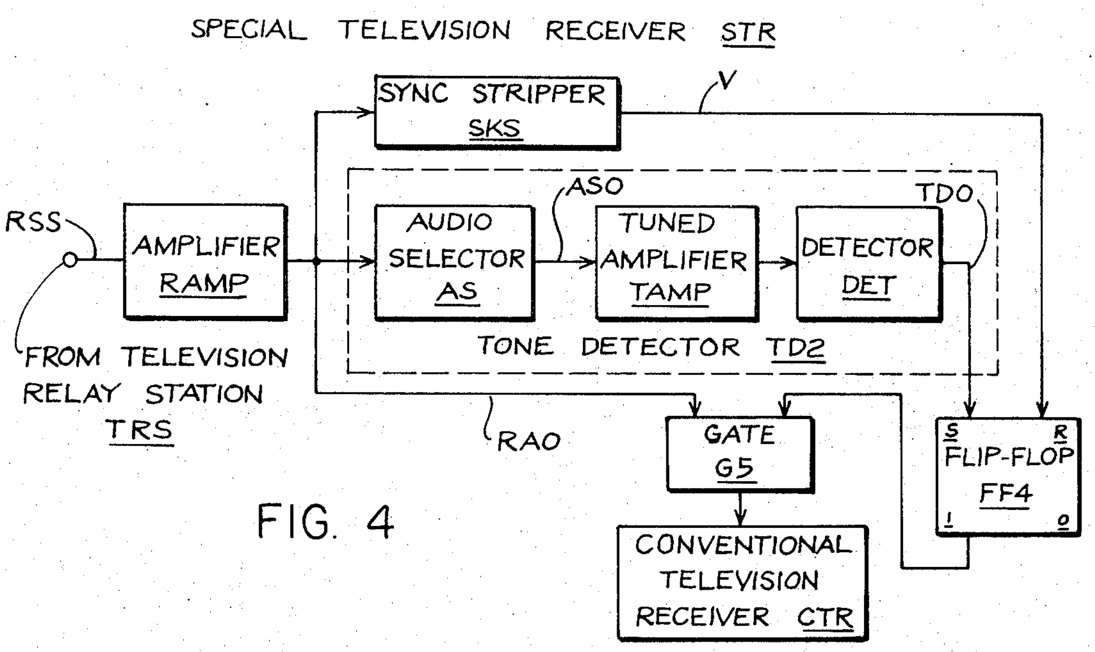
FIG. 4 is a block diagram of a special television receiver of the system of FIG. 1.

In FIG. 4 there is shown a special television receiver STR comprising a conventional television receiver CTR whose input is connected via an interface unit to the line RSS from relay station TRS.

The interface unit includes a broad band amplifier RAMP having an output line RAO connected to the signal input of gate G5' whose signal output is connected to the signal input of receiver CTR. The control input of gate G5' is connected to the 1 output of flip-flop FF4. Thus, the passage of video information to receiver CTR is determined by the state of flip-flop FF4 which is generally in the cleared state. This flip-flop FF4 is switched to the set state by a pulse on line TDO whenever tone detector TD2 senses a characteristic signal at the start of a special field and is cleared at the end of this field by a vertical sync pulse on line V from sync stripper SKS. Thus, whenever a characteristic signal is received, gate G5' opens for one field time and the special field is transmitted to receiver CTR. Sync stripper SKS can be similar to that portion of the conventional sync strippers of a television receiver which select the vertical sync pulses. Tone detector TD2 can include an audio selector AS which can be similar to the conventional audio heterodyning and detector circuits of a television receiver. The output of selector AS is fed, via line ASO, to tuned amplifier TAMP which can be a conventional tuned amplifier which is tuned to the frequency of the characteristic tone. The output of amplifier TAMP is connected to detector DET which can be a conventional half-wave rectifier so that it emits a pulse whenever it receives a burst of tone frequency signal.

As described receiver STR comprises a conventional television receiver CTR and an interface unit. However, it should be apparent that the conventional receiver can be modified in the following way. Gate G5' is interposed somewhere in the video channel. For example, the path from the video output amplifier to the intensity grid of the cathode-ray tube can be opened, the signal input of gate G5' connected to the video output amplifier and the signal output of gate G5' connected to the CRT intensity grid. The flip-flop FF4 is used as before, but sync stripper SKS is deleted. Instead, the line V is connected to the output of the vertical sync pulse generator of the receiver. The amplifier RAMP and the audio selector AS are deleted but the line ASO connects tuned amplifier TAMP to the audio output amplifier of the receiver.

It should be noted that receiver STR could include a frame store to store special fields which occur intermittently. Furthermore, for slow special field rates, it may be desirable to use long persistent phosphors in the cathode-ray tube.

Figure 5:
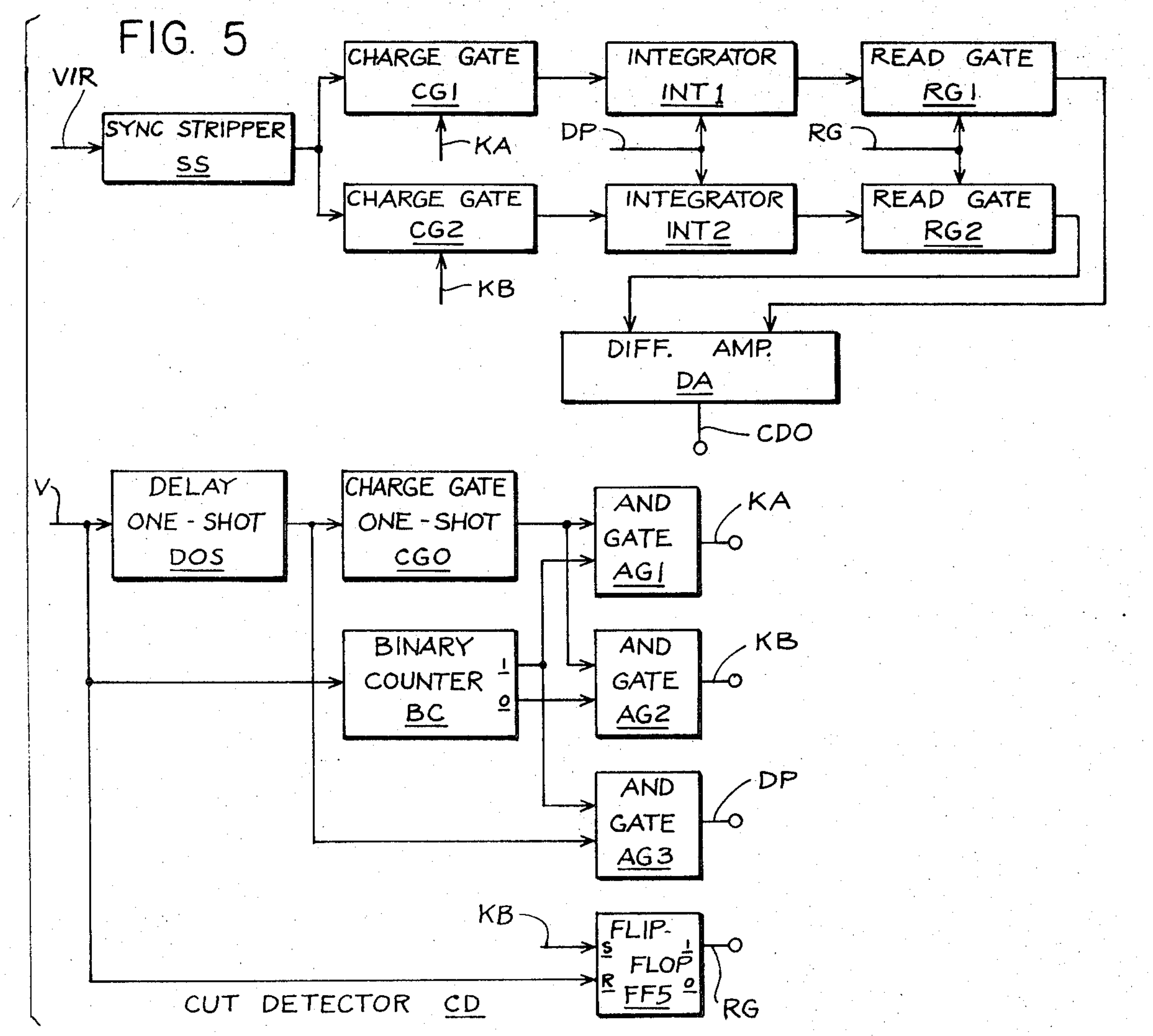
FIG. 5 is a block diagram of apparatus for detecting the cuts.

Cut detector CD of FIG. 5 receives the signals representing the fields on line VIR and feeds them to sync stripper SS for removing the sync pulses from the fields. The output of sync stripper SS is fed to the inputs of charge gates CG1 and CG2, conventional video gates whose binary transmission state is controlled by signals of lines KA and KB respectively. When a signal is present of line KA, gate CG1 is open and transmits signals from its output to the input of integrator INT1. Similarly, when a signal is present of line KB, gate CG2 is open and transmits signals from its output to the input of integrator INT2. As will hereinafter become apparent the signal on line KA is present during alternate fields, and the signal on line KB is present for the other fields. It will be assumed that there is a signal present on line KA for odd numbered fields and on line KB for even numbered fields. Each of the integrators can be conventional sample-and-hold devices which store a charge until discharged. The only limitation is that they have time constants such that they do not saturate for even a full-white video signal during the time their respective charge gates are transmissive. In any event, integrator INT1 accumulates a charge related to the "white" contents of an odd field while integrator INT2 accumulates a charge similarly related to the "white" content of the next even field. These charges are stored without loss until they are discharged by the integrators in response to a signal on line DP which occurs as the start of each odd field. However, just prior to the discharge a signal is received at the control inputs of read gates RG1 and RG2 (conventional video gates). In response to these signals, the output of integrator INT1 is connected to a first input of differential amplifier DA, and the output of integrator INT2 is connected to the second input of differential amplifier DA. The gain of the amplifier is adjusted to provide an output when the levels of the input signals differ by a substantial amount. This will occur when the "white" content of two successive fields are considerably different i.e., when there is a scene cut.

The remaining circuitry is directed to the logic for generating the signals on lines KA, KB, DP and RG. The vertical sync pulse V associated with an odd field is fed to the input of delay one-shot DOS and to the input of binary counter BC and to the reset terminal of flip-flop FF5. The delay one-shot DOS can be a monostable multivibrator which emits a pulse having a duration of a fraction of a field period whenever it receives a pulse at its input. The binary counter BC can be a one stage binary counter. The flip-flop FF5 can be a bistable-multivibrator that is toggled to the 1 state by the trailing edge of a signal received at its S input and is toggled to the 0 state by the trailing edge of a signal received at its R input. Accordingly, the odd field pulse on line V toggles the flip-flop FF5 to the 0 state and there is no signal on line RG and triggers the binary counter BC to the 1 state causing the feeding of a signal to one input of AND gates AG3 and AG1 and terminating a signal to one input of AND gate AG2. The AND gates are conventional two-input binary logic AND circuits. At this time the AND gates AG1 and AG3 are open while AND gate AG2 is blocked. In addition, the odd field pulse on line V triggered delay one-shot DOS which transmits a pulse to the second input of the open AND gate AG3 (which signal is fed via line DP to discharge the integrators INT1 and INT2) and to the input of charge gate one-shot CGO. One-shot CGO can be a monostable multivibrator which when triggered emits a pulse having a duration which is less than a field period. The output of one-shot CGO is connected to the second inputs of AND gates AG1 and AG2. Thus, since AND gate AG1 is alerted at this time and AND gate AG2 is blocked, AND gate AG1 transmits a pulse of line KA which opens charge gate CG1. When the next sync pulse (associated with an even field) is on line V, flip-flop FF5 remains reset, but binary counter BC is triggered to the 0 state alerting AND gate AG2 and blocking AND gates AG1 and AG3. Delay one-shot DOS is again triggered and emits a pulse which passes through AND gate AG2 to give a pulse on line KB which opens charge gate CG2. The trailing edge of the pulse on line KB toggles flip-flop FF5 to the set state causing the transmission of a signal on line RG which opens read gates RG1 and RG2. The third pulse on line V toggles flip-flop FF5 to the 0 state terminating the signal on line RG. The third pulse on line V triggers binary counter BC to the 0 state blocking AND gates AG2 and opening AND gates AG1 and AG3. This pulse on line V also triggers delay one-shot DOS which in turn triggers charge gate one-shot CGO causing a pulse to pass through AND gate AG1 to line KA. In addition, the output of delay one-shot DOS causes AND gate AG3 to emit an integrator discharge pulse on line DP, and the cycle continues repeating thereafter.

Several variations of portions of the system come within the scope of the invention.

For example, the amplitude of the video signals from the source of special information SSI can be less than the amplitude of the video signals from the source of regular programs SRP. In addition, source SSI can transmit a field or portion thereof in regular form and then in complemented form so that the overall effect at a regular receiver is a graying of the visual effect. At the same time, the special receiver can be constructed to ignore the complemented form. Both of these techniques are used to mask the flick if required.

While the system has been described as transmitting entire fields of special information starting at the first vertical sync pulse after cut detection, the invention also contemplates transmitting portions of such fields even at the time of cut detection.

Furthermore, although the control signals were indicated as tones it should be noted that special coding signals could be incorporated in the top or bottom line of the video signals in a field.

Figure 6:
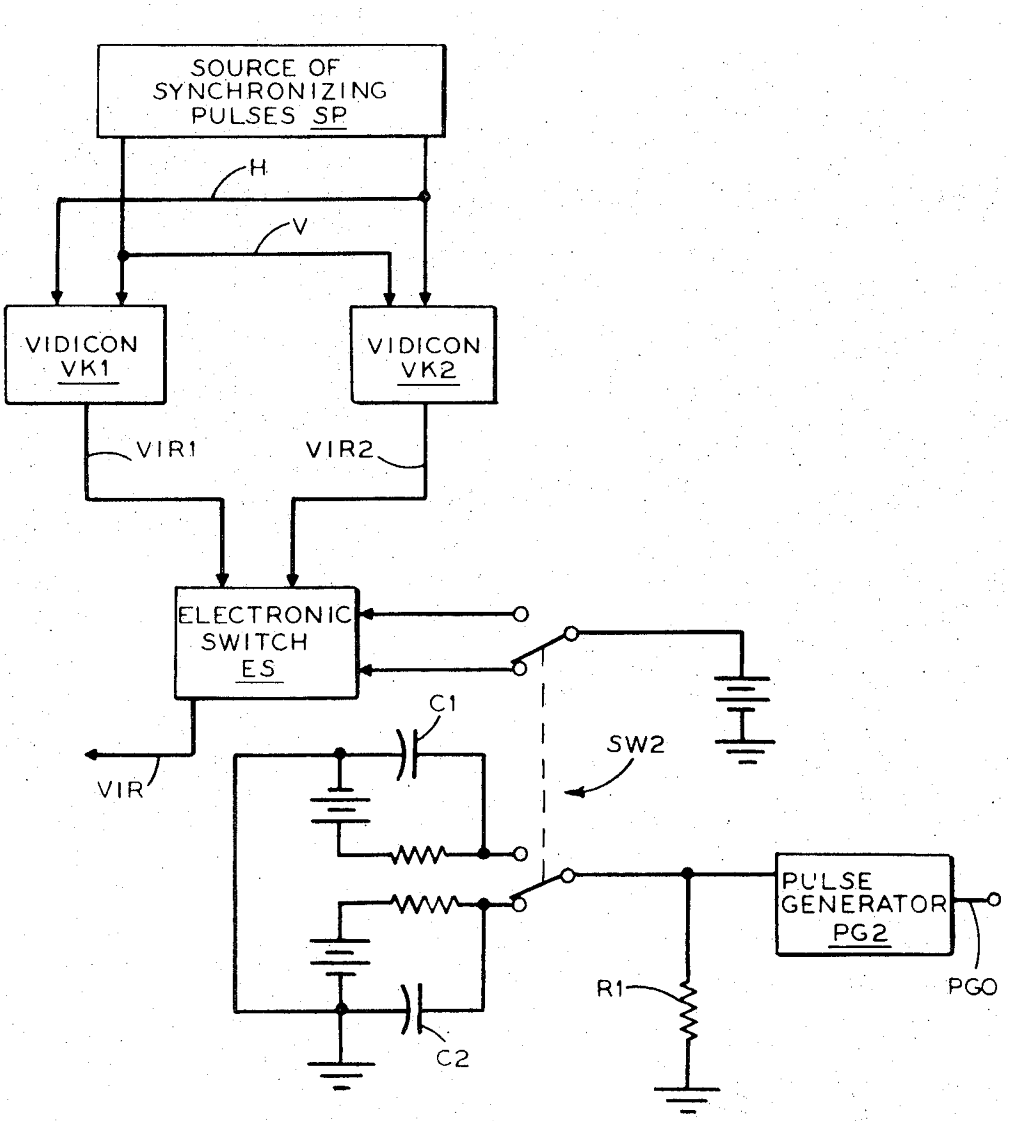
FIG. 6 is a block diagram of another embodiment of the television station.

Finally, while cut detection was illustrated by monitoring the video signals other methods are possible. For example, FIG. 6 shows apparatus for another method of detecting the cuts. In this apparatus source of regular programs SRP can be two or more vidicon cameras VK focused on the same screen under control of a program director who selects the source of the video signal by means of double-pole double-throw switch SW2. The position of switch SW2 controls the passage of video signals from either of the vidicon cameras to the line VIR of FIG. 2. When switch SW2 is in the position shown, the video signals from vidicon camera VK1 pass via line VIR1 and electronic switch ES to line VIR; when switch SW2 is in the other position, the video signals from vidicon camera VK2 pass via line VIR2 and electronic switch ES to line VIR. In other words, the position of switch SW2 activates switching paths in electronic switch ES. Electronic switch ES is well known in the television art and can be an RCA Special Effects Generator (TA–1) or TELMET Model 490SA1. During the switching between vidicon cameras a cut occurs. This cut is indicated by pulse generator PG2 It should be noted that each time switch SW2 changes position one of the capacitors C1 or C2 is discharged through resistor R1 to trigger pulse generator PG2 which emits a pulse on line PGO. This pulse can be used in several ways. For example, in the cut detector CD (FIG. 5), it can be fed to the set input S of flip-flop FF5 so that the cut detector merely becomes flip-flop FF5 and AND-circuit A2. The remainder of the detector is not required.

Alternately, the signal on line PGO can be fed to a characteristic signal generator which generates a signal for incorporation in the video or audio which is later detected to perform the function of indicating where a special field is to be introduced in the series of regular program fields. The first alternative is preferably used for live programing while the second for preferably recorded programing.

What is claimed is:

1. A television transmission system comprising a first source of at least fields of general viewer information wherein the general viewer information is interspersed with cuts, a second source of at least portions of fields of special viewer information, transmitter means for transmitting at least fields of general and special viewer information, switching means for normally connecting said first source to said transmitter means, means for sensing for the interspersed cuts, control means responsive to the sensing of a cut by said sensing means to cause said switching means to connect said second source to said transmitter means for a given period of time.

2. The television transmission system of claim 1, wherein said second source is connected to said transmitter means for at least one field time.

3. The television transmission system of claim 1 further comprising means for introducing into the information transmitted by said transmitter means a characteristic signal at least at the start of each transmission of special viewer information.

4. The television transmission system of claim 2 further comprising means for causing the transmitter means to transmit a characteristic signal at the start of the transmission of a field of special viewer information.

5. The television transmission system of claim 4 further comprising receiver means, said receiver means including display means for displaying at least fields of general and special viewer information, and display control means detecting said characteristic signal for controlling said display means to display only fields of special viewer information.

6. The television transmission system of claim 4 further comprising relay means for receiving and retransmitting the fields of viewer information, said relay means including means responsive to said characteristic signal for deleting the transmission of fields associated with said characteristic signal.

7. The television system of claim 4 further comprising relay means for receiving and retransmitting the fields of general and special viewer information, said relay means including means responsive to said characteristic signal for only transmitting fields associated with said characteristic signal.

8. The television system of claim 1 wherein said cut-sensing means comprises means for monitoring signal characteristics of the fields of general viewer information.

9. The television system of claim 1 wherein the signals representing the information from said second source are of lower amplitude than the signals representing the information from said first source.

* * * * *